United States Patent
Magnuson et al.

(10) Patent No.: US 12,509,950 B2
(45) Date of Patent: Dec. 30, 2025

(54) DUAL SPEED LINEAR ACTUATOR ASSEMBLY

(71) Applicant: Nabors Drilling Technologies USA, Inc., Houston, TX (US)

(72) Inventors: Christopher Magnuson, Houston, TX (US); Mark Docherty, Houston, TX (US); Vladimir Scekic, New Westminster (CA); Predrag Radovanovic, Belgrade (RS); Dejan Pavlovic, Zeleznik (RS)

(73) Assignee: Nabors Drilling Technologies USA, Inc., Houston, TX (US)

( * ) Notice: Subject to any disclaimer, the term of this patent is extended or adjusted under 35 U.S.C. 154(b) by 15 days.

(21) Appl. No.: 18/474,359

(22) Filed: Sep. 26, 2023

(65) Prior Publication Data

US 2024/0110449 A1    Apr. 4, 2024

Related U.S. Application Data

(60) Provisional application No. 63/378,039, filed on Sep. 30, 2022.

(51) Int. Cl.
| | | |
|---|---|---|
| *E21B 19/16* | (2006.01) | |
| *F16H 25/08* | (2006.01) | |
| *H02K 7/06* | (2006.01) | |

(52) U.S. Cl.
CPC ........... *E21B 19/164* (2013.01); *F16H 25/08* (2013.01); *H02K 7/06* (2013.01)

(58) Field of Classification Search
CPC .................. E21B 19/164; F16H 25/08; F16H 2007/0857; F16H 25/00; F16H 2025/228; H02K 7/06
See application file for complete search history.

(56) References Cited

U.S. PATENT DOCUMENTS 4,938,543 A * 7/1990 Parker ................... B60T 8/4266
                                                             303/162
6,138,776 A   10/2000 Hart et al.
(Continued)

FOREIGN PATENT DOCUMENTS

| BR | PI0915190 B1 | 4/2019 |
|---|---|---|
| CN | 108000556 A | 5/2018 |

(Continued)

OTHER PUBLICATIONS

Dyao Stephen Ogunyale, "Design of Cooling Systems for 6-Axis Welding Robot Drives," HAMK University of Applied Sciences, Degree Programme in Augomation Engineering, Valkeakoski Jan. 2, 2013, 38 pgs.

(Continued)

*Primary Examiner* — Zakaria Elahmadi
(74) *Attorney, Agent, or Firm* — Christopher L. Johnson (57) ABSTRACT

A linear actuator assembly that can include a drive shaft, and a piston, where rotation of the drive shaft extends or retracts the piston at a speed that automatically changes based on an opposing force applied to the piston. A system that can include a piece of rig equipment configured to engage an object, with one or more linear actuator assemblies incorporated into the piece of rig equipment, where the linear actuator assemblies selectively engage the object and each of the linear actuator assemblies can include a drive shaft, and a piston, and where rotation of the drive shaft extends or retracts the piston at a speed that automatically changes based on an opposing force applied to the piston.

20 Claims, 9 Drawing Sheets

(56) References Cited

U.S. PATENT DOCUMENTS

| | | | |
|---|---|---|---|
| 6,392,322 | B1 | 5/2002 | Mares et al. |
| 6,731,091 | B2 | 5/2004 | Hietmann et al. |
| 7,464,622 | B2 | 12/2008 | Markert et al. |
| 8,015,890 | B2 | 9/2011 | Christensen et al. |
| 8,109,370 | B2 | 2/2012 | Yamasaki |
| 8,495,930 | B2 | 7/2013 | Haughom |
| 8,777,199 | B2 | 7/2014 | Webb |
| 9,369,024 | B2 | 6/2016 | Yamasaki et al. |
| 9,574,648 | B2 | 2/2017 | Ikeda et al. |
| 9,614,408 | B2 | 4/2017 | Funada |
| 9,768,662 | B2 | 9/2017 | Urata et al. |
| 9,890,840 | B2 | 2/2018 | Ohnishi et al. |
| 10,480,291 | B2 | 11/2019 | Wiedecke et al. |
| 10,648,545 | B2 | 5/2020 | Mizuuchi |
| 10,822,891 | B2 | 11/2020 | Mikalsen et al. |
| 11,085,512 | B2 | 8/2021 | Shimizu |
| 11,313,184 | B2 | 4/2022 | Søyland et al. |
| 2004/0051326 | A1 | 3/2004 | Belik |
| 2004/0231127 | A1 | 11/2004 | Cartsensen |
| 2004/0237726 | A1 | 12/2004 | Schulze Beckinghausen |
| 2006/0102697 | A1 | 5/2006 | Nagai et al. |
| 2007/0074606 | A1 | 4/2007 | Halse |
| 2008/0277108 | A1 | 11/2008 | Bouligny, Jr. et al. |
| 2010/0025046 | A1 | 2/2010 | Francis et al. |
| 2011/0169357 | A1 | 7/2011 | Gieras et al. |
| 2013/0071218 | A1 | 3/2013 | Hosek et al. |
| 2014/0305265 | A1 | 10/2014 | Haughom |
| 2015/0101826 | A1 | 4/2015 | Gupta et al. |
| 2015/0107850 | A1* | 4/2015 | Mosing ................. E21B 19/164 81/57.16 |
| 2015/0252633 | A1 | 9/2015 | Fulks |
| 2015/0285348 | A1 | 10/2015 | Ikeda et al. |
| 2016/0338221 | A1 | 11/2016 | Rush et al. |
| 2016/0340030 | A1 | 11/2016 | Roussey et al. |
| 2019/0017619 | A1 | 1/2019 | Gagliano et al. |
| 2019/0136669 | A1 | 5/2019 | Wiedecke et al. |
| 2019/0137964 | A1 | 5/2019 | Wiedecke et al. |
| 2019/0309586 | A1 | 10/2019 | Søyland et al. |
| 2019/0330937 | A1 | 10/2019 | Mikalsen et al. |
| 2020/0023513 | A1 | 1/2020 | Ha et al. |
| 2021/0293091 | A1 | 9/2021 | Mikalsen et al. |
| 2021/0293100 | A1 | 9/2021 | Van Duivendijk et al. |
| 2021/0293101 | A1 | 9/2021 | Søyland |
| 2021/0293102 | A1 | 9/2021 | Larsen |

FOREIGN PATENT DOCUMENTS

| | | | | |
|---|---|---|---|---|
| DE | 102008062430 | B4 | 1/2011 | |
| EP | 2075656 | A1 * | 7/2009 | ............... B23Q 5/40 |
| EP | 4019799 | A1 * | 6/2022 | ............. B64C 25/44 |
| JP | H05-122890 | A | 5/1993 | |
| MX | 322254 | B | 7/2014 | |
| RU | 2672891 | C2 | 11/2018 | |
| WO | 2005/056975 | A1 | 6/2005 | |
| WO | 2005079134 | A2 | 9/2005 | |
| WO | 2006/055467 | A1 | 5/2006 | |
| WO | 2008008603 | A2 | 1/2008 | |
| WO | 2013/040401 | A1 | 3/2013 | |
| WO | 2016/205038 | A1 | 12/2016 | |
| WO | 2019/174691 | A1 | 9/2019 | |
| WO | 2021185963 | A1 | 9/2021 | |

OTHER PUBLICATIONS

Robbie Dickson, "Linear Actuators 101—Everything you need to know about Linear Actuators," Firgelli Automations, Nov. 16, 2018, 19 pgs, https://www.firgelliauto.com/blogs/news/linear-actuators-101 Engineering, Valkeakoski Jan. 2, 2013, 38 pgs.

"Carlos Gonzalez, ""What's the Difference Between Pneumatic, Hydraulic, and Electrical Actuators?"" Machine Design, Apr. 16, 2015, 5 pgs, https://www.machinedesign.com/mechanical-motion-systems/linear-motion/article/21832047/whats-the-difference-between-pneumatic-hydraulic-and-electrical-actuators".

International Search Report from PCT Application No. PCT/EP2021/056936 dated May 31, 2021, 1 pg.

International Search Report from PCT Application No. PCT/EP2021/056939 dated Jun. 28, 2021, 1 pg.

International Search Report from PCT Application No. PCT/EP2021/056938 dated Jul. 23, 2021, 1 pg.

OCTG API 5DP Pipe Specifications (https://web.archive.org/web/20180628140443/https://www.mid-continents.com/drill-pipe), Archived Jun. 28, 2018 (Year: 2018).

* cited by examiner

Section view 4-4

FIG. 4

FIG. 5A  Section view 4-4

Section view 4-4
FIG. 5B

FIG. 5C  Section view 4-4

DUAL SPEED LINEAR ACTUATOR ASSEMBLY

CROSS-REFERENCE TO RELATED APPLICATION(S)

This application claims priority under 35 U.S.C. § 119(e) to U.S. Provisional Application No. 63/378,039, entitled "DUAL SPEED LINEAR ACTUATOR ASSEMBLY," by Christopher MAGNUSON et al., filed Sep. 30, 2022, which is assigned to the current assignee hereof and incorporated herein by reference in its entirety.

FIELD OF THE DISCLOSURE

The present invention relates, in general, to the field of linear actuators. More particularly, present embodiments relate to a system and method for using a linear actuator with dual speed and dual force capabilities.

BACKGROUND

Robots continue to advance the art of drilling and producing wells in the oil and gas industry. Robots can be powered by various means (e.g., hydraulic, pneumatic, electric, etc.). Hydraulics or pneumatics reduce the risk of developing sparks on a rig floor, where volatile fluids and gases may be present. Using electric power can significantly increase the risk of sparks occurring during robot operation in areas that are susceptible to having volatile fluids and gases present (e.g., a rig floor), but may possibly reduce necessary support equipment, such as fluid pumps, containment means, etc., for system operations (e.g., rig operations).

The force requirements for making or breaking a joint in a segmented tubular string can be on the order of 250 kNm, while the space requirements to engage tubular ends that make up the joint can be rather small when compared to the amount of force to be applied in the limited space.

Using hydraulically powered equipment has been able to supply the needed force for the pipe handling equipment in use today. However, the support equipment needed for supplying the pressurized hydraulic fluid to the rig equipment is bulky, hazardous, messy, and the hydraulic pressures used to drive the rig equipment can be dangerous.

The use of electric motors in some areas has still not been widely accepted because of the overall system requirements, including conforming to guidelines for operating in explosive environments. The iron roughneck is a good example of requiring a high engagement force being applied from a size-restricted space and applied to a substantially small area, and operating in an explosive environment, with the iron roughneck supporting a wide range of diameters.

Therefore, improvements in the art of electrically operated linear actuators are continually needed.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes linear actuator assembly with a first drive shaft; and a piston, where rotation of the first drive shaft extends or retracts the piston at a speed that automatically changes based on an opposing force applied to the piston.

One general aspect includes a system for performing a subterranean operation. The system also includes a piece of rig equipment configured to engage an object; one or more linear actuator assemblies are incorporated into the piece of rig equipment, where the one or more linear actuator assemblies selectively engage the object, where each of the one or more linear actuator assemblies may include: a first drive shaft; and a piston, where rotation of the first drive shaft extends or retracts the piston at a speed that automatically changes based on an opposing force applied to the piston by engagement with the object.

One general aspect includes a method for conducting a subterranean operation actuating a linear actuator assembly to operate at least a portion of a piece of rig equipment on a rig, where the piece of rig equipment performs a function on a rig during execution of the subterranean operation, the linear actuator assembly may include: a first drive shaft; and a piston, where rotation of the first drive shaft extends or retracts the piston at a speed that automatically changes based on an opposing force applied to the piston. Other embodiments of this aspect include corresponding computer systems, apparatus, and computer programs recorded on one or more computer storage devices, each configured to perform the actions of the methods.

One general aspect includes a method of operating a linear actuator assembly. The method also includes coupling a motor to a first drive shaft; rotating, via the motor, a first drive shaft in a first direction; extending a piston at a first speed in response to rotating the first drive shaft in the first direction; receiving an opposing force at the piston; and automatically changing an extension speed of the piston from the first speed to a second speed due to the piston receiving the opposing force. Other embodiments of this aspect include corresponding computer systems, apparatus, and computer programs recorded on one or more computer storage devices, each configured to perform the actions of the methods.

One general aspect includes a method of operating a linear actuator assembly. The method also includes coupling a motor to a first drive shaft; rotating, via the motor, a first drive shaft in a first direction; extending a piston at a first torque in response to rotating the first drive shaft in the first direction; receiving an opposing force at the piston; and automatically changing an extension torque of the piston from the first torque to a second torque due to the piston receiving the opposing force. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Figure 1A:
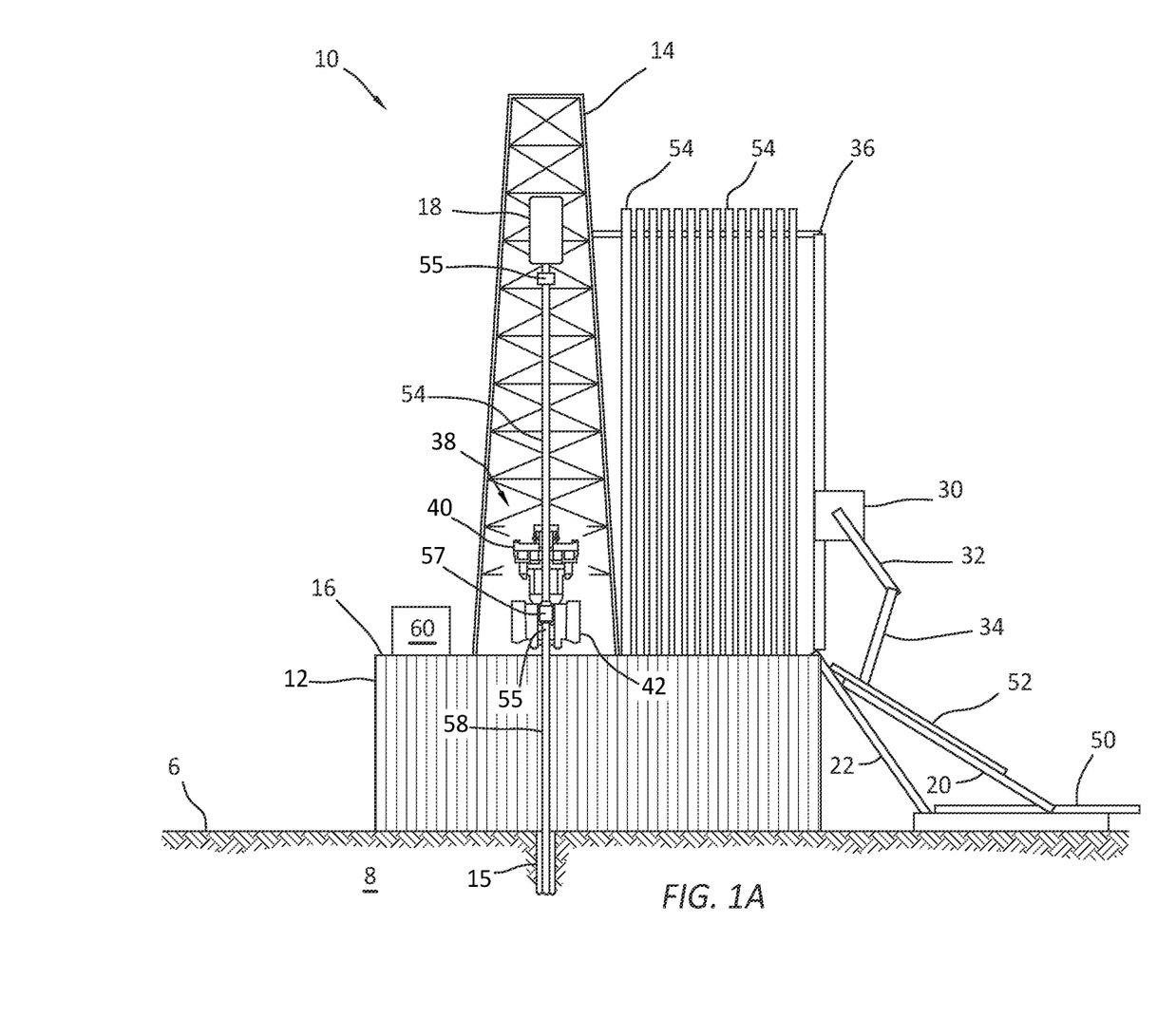
FIG. 1A is a representative simplified front view of a rig being utilized for a subterranean operation, in accordance with certain embodiments.

FIG. 1A is a representative simplified front view of a rig being utilized for a subterranean operation (e.g., tripping in or out a tubular string 58 to or from a wellbore 15), in accordance with certain embodiments. The rig 10 can include a platform 12 with a rig floor 16 and a derrick 14 extending up from the rig floor 16. The derrick 14 can provide support for hoisting the top drive 18 as needed to manipulate tubulars. A catwalk 20 and V-door ramp 22 can be used to transfer horizontally stored tubular segments 50 to the rig floor 16. A tubular segment 52 can be one of the horizontally stored tubular segments 50 that is being transferred to the rig floor 16 via the catwalk 20. A pipe handler 30 with articulating arms 32, 34 can be used to grab the tubular segment 52 from the catwalk 20 and transfer the tubular segment 52 to the top drive 18, the fingerboard 36, the wellbore 15. etc. However, it is not required that a pipe handler 30 be used on the rig 10. The top drive 18 can transfer tubulars directly between the catwalk 20 and the top drive 18 (e.g., using an elevator coupled to the top drive). As used herein, "tubular" refers to an elongated cylindrical tube and can include any of the tubulars manipulated around the rig 10, such as tubular segments 50, 52, tubular stands, tubulars 54, and tubular string 58, but not limited to the tubulars shown in FIG. 1A. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

The tubular string 58 can extend into the wellbore 15, with the wellbore 15 extending through the surface 6 into the subterranean formation 8. When tripping the tubular string 58 into the wellbore 15, tubulars 54 are sequentially added to the tubular string 58 to extend the length of the tubular string 58 into the earthen formation 8. FIG. 1A shows a land-based rig. However, it should be understood that the principles of this disclosure are equally applicable to off-shore rigs where "off-shore" refers to a rig with water between the rig floor and the earth surface 6.

When tripping the tubular string 58 out of the wellbore 15, tubulars 54 are sequentially removed from the tubular string 58 to reduce the length of the tubular string 58 in the wellbore 15. The pipe handler 30 can be used to deliver the tubulars 54 to a well center on the rig floor 16 in a vertical orientation and hand the tubulars 54 off to an iron roughneck 38 or a top drive 18. The pipe handler 30 can also be used to remove the tubulars 54 from the well center in a vertical orientation and receive the tubulars 54 from the iron roughneck 38 or a top drive 18. The iron roughneck 38 can make a threaded connection between a tubular 54 being added and the tubular string 58. A spinner assembly 40 can engage a body of the tubular 54 to spin a pin end 57 of the tubular 54 into a threaded box end 55 of the tubular string 58, thereby threading the tubular 54 into the tubular string 58. The wrench assembly 42 can provide a desired torque to the threaded connection, thereby completing the connection. This process can be reversed when the tubulars 54 are being removed from the tubular string 58.

A rig controller 60 can be used to control the rig 10 operations including controlling various rig equipment, such as the pipe handler 30, the top drive 18 and the iron roughneck 38. The rig controller 60 can control the rig equipment autonomously (e.g., without periodic operator interaction), semi-autonomously (e.g., with limited operator interaction such as initiating a subterranean operation, adjusting parameters during the operation, etc.), or manually (e.g., with the operator interactively controlling the rig equipment via remote control interfaces to perform the subterranean operation). A portion of the rig controller 60 can also be distributed around the rig 10, such as having a portion of the rig controller 60 in the pipe handler 30 and the iron roughneck 38 or at one or more various locations around the rig 10 or remote from the rig 10.

Figure 1B:
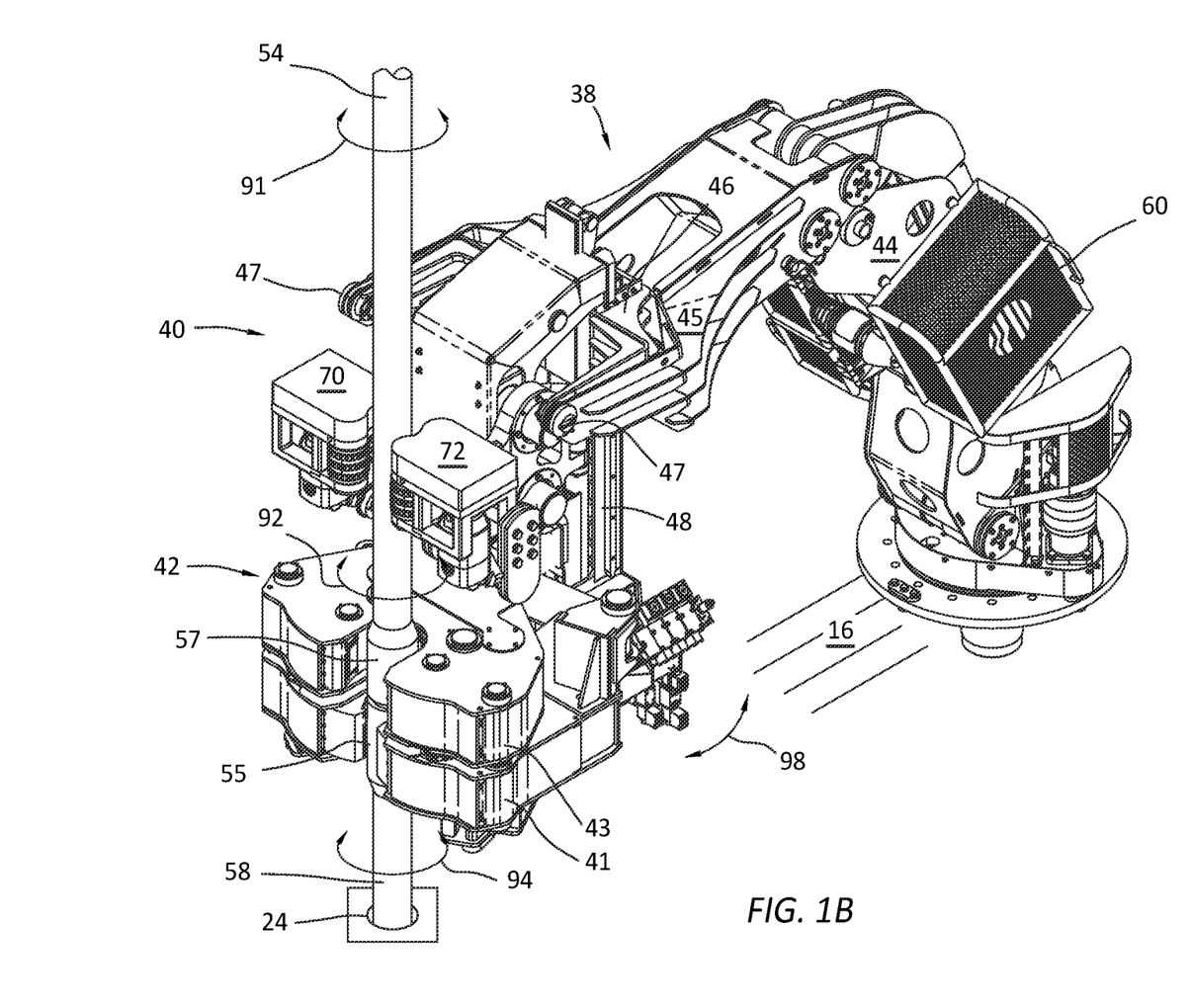
FIG. 1B is a representative perspective view of an iron roughneck with a spinner assembly on a rig floor engaging a tubular string, in accordance with certain embodiments.

FIG. 1B is a representative perspective view of an iron roughneck 38 on a rig floor 16 with a body of a tubular 54 engaged with a spinner assembly 40 and a wrench assembly 42 gripping both the box end 55 of the tubular string 58 and the pin end 57 of the tubular 54. The iron roughneck 38 can include a robot arm 44 that supports the iron roughneck 38 from the rig floor 16. The robotic arm 44 can include a support arm 45 that can couple to a frame 48 via a frame arm 46. The support arm 45 can support and lift the frame 48 of the iron roughneck 38 via the frame arm 46, which can be rotationally coupled to the support arm 45 via the pivots 47. The frame 48 can provide structural support for the spinner assembly 40 and the wrench assembly 42. The robotic arm 44 can move the frame 48 from a retracted position (i.e., away from the well center 24) to an extended position (i.e., toward the well center 24) and back again as needed to provide support for making or breaking connections in the tubular string 58. In the extended position of the frame 48, the spinner assembly 40 and the wrench assembly 42 can engage the tubular 54 and the tubular string 58, respectively.

The top drive 18 (not shown) can rotate the tubular string 58 in either clockwise or counterclockwise directions as shown by arrows 94. The tubular string 58 is generally rotated in a direction that is opposite the direction used to unthread tubular string 58 connections. When a connection is to be made or broken, a backup tong assembly 41 of the wrench assembly 42 can grip the box end 55 of the tubular string 58. The backup tong assembly 41 can prevent further rotation of the tubular string 58 by preventing rotation of the box end 55 of the tubular string 58.

If a connection is being made, the spinner assembly 40 can engage the tubular 54 at a body portion, which is the portion of the tubular between the pin end 57 and box end 55 of the tubular 54. With the pin end 57 of the tubular 54 engaged with the box end 55 of the tubular string 58, the spinner assembly 40 can rotate the tubular 54 in a direction (arrows 91) to thread the pin end 57 of the tubular 54 into the box end 55 of the tubular string 58, thereby forming a connection of the tubular 54 to the tubular string 58. When a pre-determined torque of the connection is reached by the spinner assembly 40 rotating the tubular 54 (arrows 91), then a torque wrench assembly 43 of the wrench assembly 42 can grip the pin end 57 of the tubular 54 and rotate the pin end 57. By rotating the torque wrench assembly 43 relative to the backup tong assembly 41 (arrows 92), the wrench assembly 42 can torque the connection to a desired torque, thereby completing the connection of the tubular 54 to the tubular string 58. The iron roughneck 38 can then be retracted from the well center 24 and the subterranean operation can continue.

If a connection is being broken, the backup tong assembly 41 can grip the box end 55 of the tubular string 58 and the torque wrench assembly 43 can grip the pin end 57 of the tubular 54. By rotating the pin end 57 of the tubular 54 relative to the box end 55 of the tubular string 58, the previously torqued connection can be broken loose. After the connection is broken, spinner assembly 40 can engage the tubular 54 at the body portion and can rotate the tubular 54 relative to the tubular string 58 (arrows 91), thereby releasing the tubular 54 from the tubular string 58. The tubular 54 can then be removed from the well center 24 by the top drive 18 or pipe handler 30 (or other means) and the iron roughneck 38 retracted from the well center 24 to allow the top drive 18 access to the top end of the tubular string 58.

The position of the spinner assembly 40 and wrench assembly 42 relative to the rig floor 16 (and thus the tubular string 58) can be controlled by the controller 60 via the robotic arm 44 and the frame arm 46, which is moveable relative to the frame 48. The controller 60 or other controllers, via the robotic arm 44, can manipulate the frame 48 by lifting, lowering, extending, retracting, rotating the arm, etc. The robotic arm 44 can be coupled to the frame 48 via the support arm 45 which can be rotatably coupled to the frame arm 46 via pivots 47. The frame 48 can move up and down relative to the frame arm 46 to raise and lower the spinner assembly 40 and wrench assembly 42 as needed to position the assemblies 40, 42 relative to the tubular string 58. The frame 48 can also tilt (arrows 98) via pivots 47 to longitudinally align a center axis of the assemblies 40, 42 relative to the tubular string 58.

Figure 2:
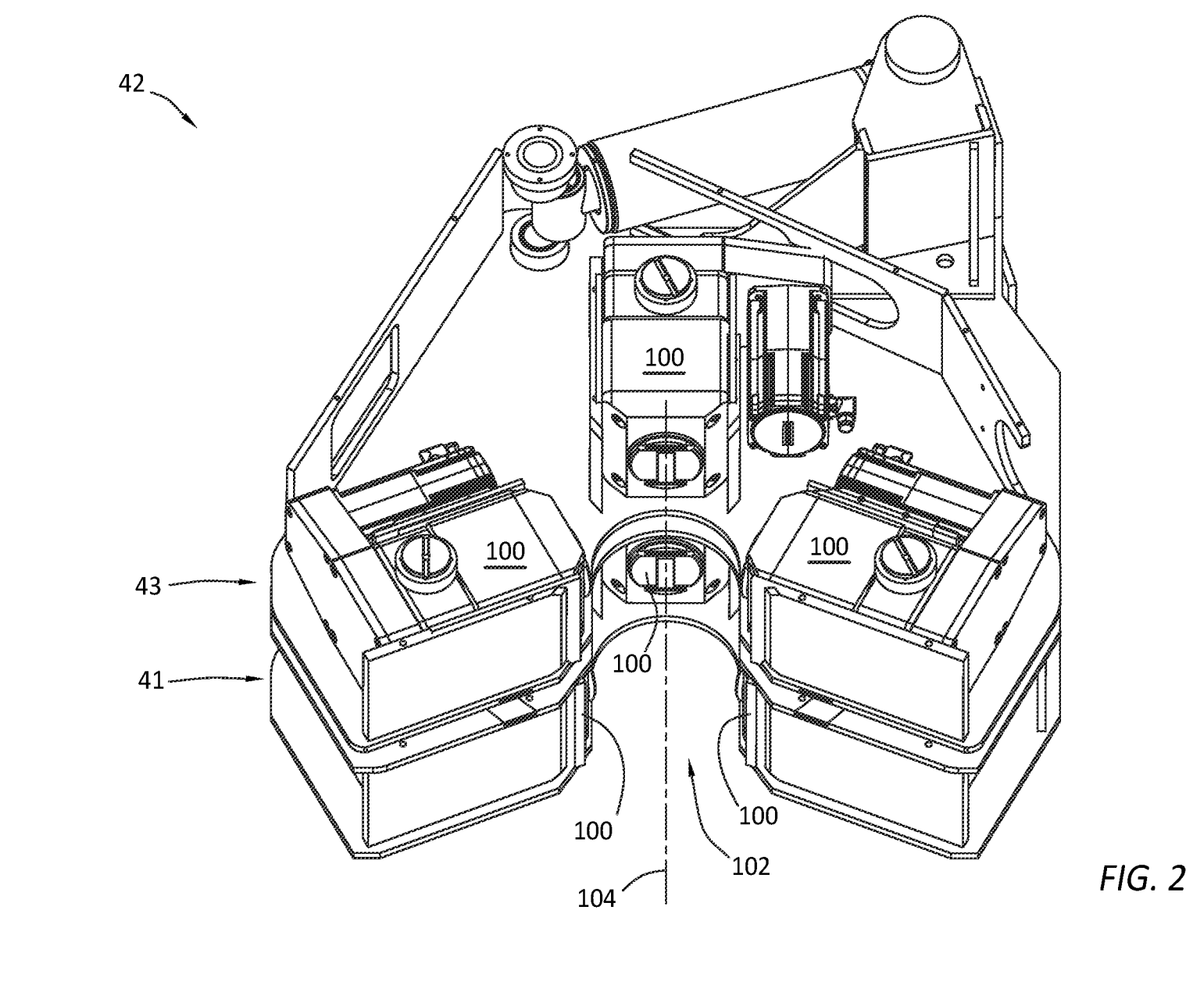
FIG. 2 is a representative perspective view of a wrench assembly of an iron roughneck utilizing a linear actuator, in accordance with certain embodiments.

FIG. 2 is a representative perspective view of a wrench assembly 42 of an iron roughneck 38 utilizing a linear actuator assembly 100, in accordance with certain embodiments. In a non-limiting embodiment, one or more actuator assemblies 100 can be utilized by one or both of the backup tong and torque wrench assemblies 41, 43. The actuator assemblies 100 can be positioned at various azimuthal positions around a center axis 104 of the opening 102. Electric power can be used to operate the linear actuator assembly 100, such as being extended into engagement and retracted from engagement with a tubular 54 when it is positioned in the opening 102. However, an iron roughneck 38 is only one piece of rig equipment that can benefit from the linear actuator assembly embodiments of this disclosure. For example, the linear actuator assembly 100 can be utilized by a pipe handler 30, a top drive 18, and an elevator (not shown).

Figure 3:
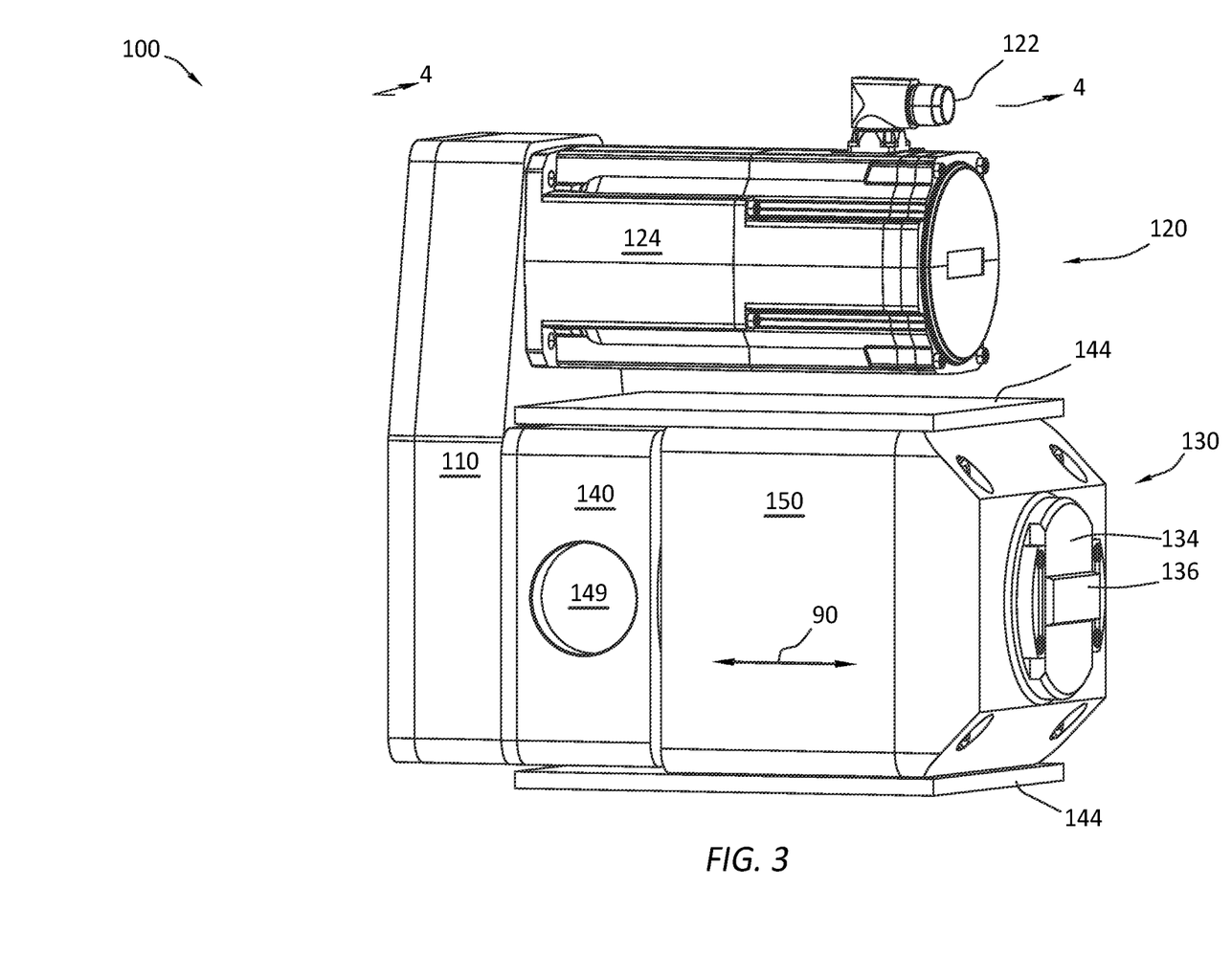
FIG. 3 is a representative perspective view of a linear actuator assembly, in accordance with certain embodiments.

FIG. 3 is a representative perspective view of a linear actuator assembly 100, in accordance with certain embodiments. Many linear actuator applications can benefit from certain embodiments of the dual speed, dual force linear actuator assembly 100. In a non-limiting embodiment, the linear actuator assembly 100 can deliver a force of up to 445 kN with increased extension/retraction speeds. The linear actuator assembly 100 can include a linear actuator 130, a motor 120, and a gearbox assembly 110 to couple a drive motor 124 to the linear actuator 130. The linear actuator 130 can include a base structure 140 that can include a mounting recess 149 for securing the linear actuator assembly 100 to a higher-level assembly (e.g., and iron roughneck 38). It should be understood that the motor 124 can be powered electrically, hydraulically, or pneumatically.

The drive motor 124 can be coupled to the linear actuator 130 via the gearbox assembly 110, such that rotation of a drive shaft of the drive motor 124 will rotate a drive shaft of the linear actuator 130 to extend or retract (arrows 90) the piston 150 of the linear actuator 130. Guides (or shields) 144 can be used to guide the piston 150 as it is extended or retracted. In a non-limiting embodiment, the piston 150 can carry an engagement device 134, which can include a die 136 for engaging an object, such as a tubular 54.

Figure 4:
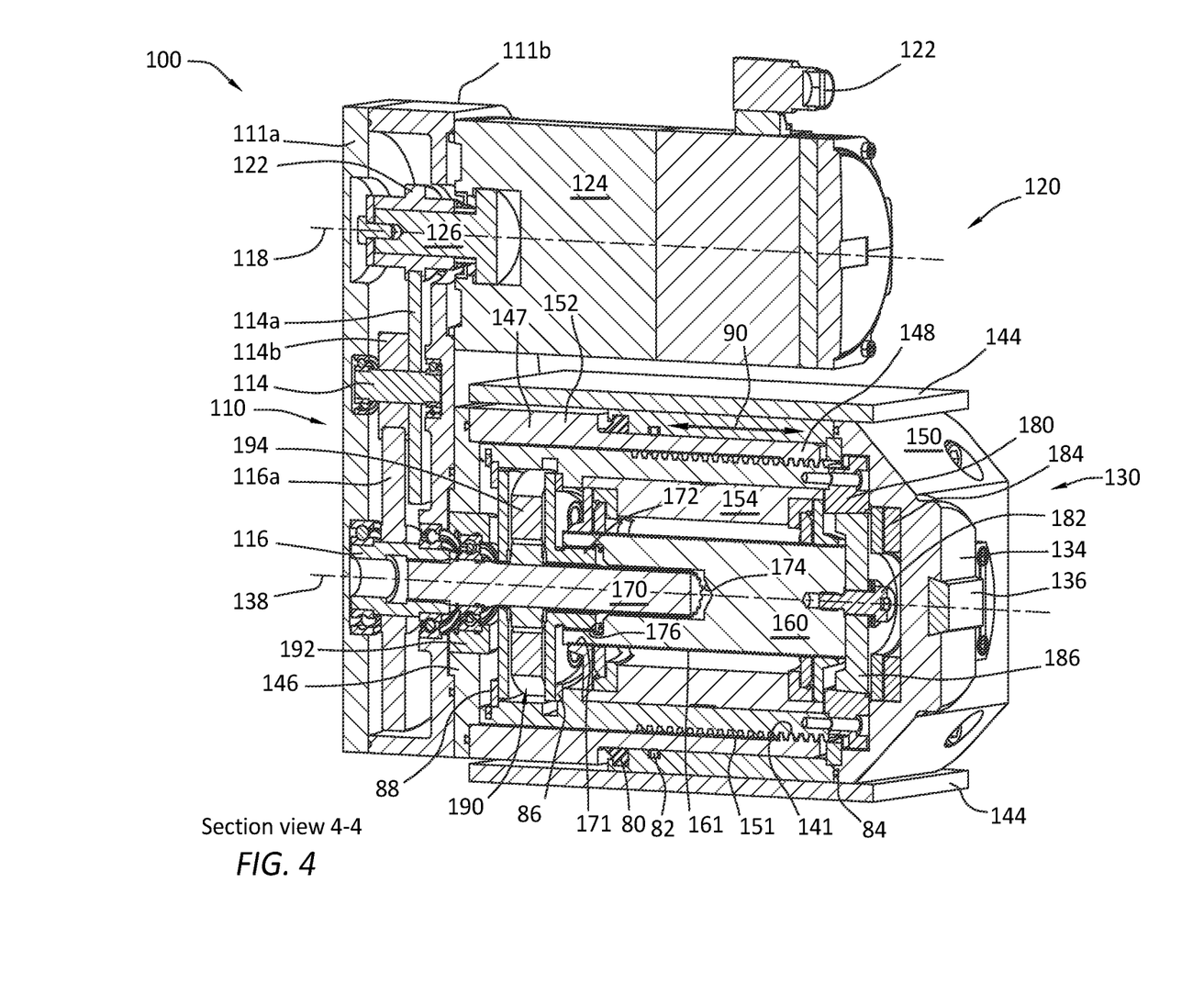
FIG. 4 is a representative partial cross-sectional view of a linear actuator assembly along section line 4-4 of FIG. 3, in accordance with certain embodiments.

FIG. 4 is a representative partial cross-sectional view of a linear actuator assembly 100 along section line 4-4 of FIG. 3, in accordance with certain embodiments. A motor 124 can receive power from an electrical connection 122 to operate the linear actuator assembly 100 via rotation of a drive shaft 126. Rotation of the drive shaft 126 in a clockwise direction can move the piston 150 of the linear actuator 130 in one linear direction. Rotation of the drive shaft 126 in a counterclockwise direction can move the piston 150 of the linear actuator 130 in an opposite linear direction (arrows 90). Rotation of the drive shaft 126 can be mechanically coupled to the drive shaft 170 and configured to rotate the drive shaft 170 via the gearbox assembly 110 in either a clockwise or counterclockwise rotation.

In a non-limiting embodiment, the drive shaft 126 can be rotationally fixed to a drive gear 112. The drive gear 112 can engage and drive a gear 114a in an opposite rotational direction than the drive gear 112. The gear 114a can be rotationally fixed to a shaft 114, which can be rotationally fixed to a gear 114b. Therefore, when the drive gear 112 rotates in a clockwise direction, the gears 114a, 114b, and the shaft 114 can rotate in a counterclockwise direction. The gear 114a can be a different diameter than the gear 114b to provide a desired gear ratio to reduce speed and increase rotational torque. The gear 114b can engage and drive a gear 116a in an opposite rotational direction than the drive gear 114b. The gear 116a can be rotationally fixed to a shaft 116, which can be rotationally fixed to a drive shaft 170.

Therefore, for example, rotating the drive shaft 126 in a clockwise direction, rotates the drive gear 112 in a clockwise direction, which rotates the gears 114a, 114b, and shaft 114 in a counterclockwise direction, which then rotates the gear 116a, and drive shafts 116, 170 in a clockwise direction. Additionally, if the drive shaft 126 were rotated in a counterclockwise direction, the gearbox 110 would cause the drive shaft 170 to rotate in a counterclockwise direction.

However, it should be understood that many gear configurations of the gearbox 110 can be utilized instead of the example shown in FIG. 4. The only requirement is that the gearbox assembly 110 mechanically couples the drive shaft 126 to the drive shaft 170, such that rotation of the drive shaft 126 rotates the drive shaft 170. They can rotate in opposite or the same directions, depending on the configuration of the gears in the gearbox assembly 110. The center axis 118 of the drive shaft 126 of the motor 124 can be parallel with the center axis 138 of the drive shaft 170 of the linear actuator 130.

The drive shaft 170 can include a splined portion that protrudes through a planetary gear assembly 190 and into a smooth bore 174 of a high torque drive shaft 160. The smooth bore 174 allows clearance for the drive shaft 170 to extend into and retract out of the smooth bore 176 as the linear actuator 130 is being operated. The splined portion of the drive shaft 170 has splines on an exterior surface of the drive shaft 170 that engage with splines on in inside surface of a sun gear 192 of the planetary gear assembly 190. As the drive shaft 170 rotates, the sun gear 192 is allowed to slide along the drive shaft 170 but is not allowed to rotate relative to the drive shaft 170. The planetary gear assembly 190 can include a cylindrical protrusion 172 that has a smooth inner surface (i.e., not splined) and is aligned with the drive shaft 170, which extends through a center of the protrusion 172. However, the drive shaft 170 does not engage the protrusion 172 and the protrusion 172 is allowed to rotate relative to the drive shaft 170.

The protrusion 172 can include a splined outer surface that engages with a splined bore 176 in the high torque drive shaft 160, which allows the high torque drive shaft 160 to translate linearly relative to the protrusion 172 but does not permit the high torque drive shaft 160 to rotate relative to the protrusion 172. The high torque drive shaft 160 can be disposed at least partially within the low torque drive sleeve 152, with both coaxially aligned with the center axis 138 of the linear actuator 130.

The high torque drive shaft 160 can be rotationally fixed, via the fastener 182, to a friction disk 186 at an opposite end of the high torque drive shaft 160 from the splined bore 176. In a retracted position of the linear actuator 130, the friction disk 186 engages, via a slightly tapered cylindrical surface, a matched tapered surface of a friction ring 180. The engagement of the friction ring 180 to the friction disk 186 applies a static friction force between the friction ring 180 and the friction disk 186 which causes the low torque drive sleeve 152 and drive cylinder 154 to rotate along with the high torque drive shaft 160 until the static friction force is overcome. When the static friction force is overcome, then the high torque drive shaft 160 is allowed to rotate relative to the low torque drive sleeve 152 and drive cylinder 154 which causes the piston 150 to extend or retract at a slower speed than when the static friction was not overcome and the low torque drive sleeve 152 and drive cylinder 154 are forced to rotate along with the high torque drive shaft 160.

The bearings 86, 88 allow the planetary gear assembly 190 to rotate relative to the low torque drive sleeve 152 and the drive cylinder 154. The drive cylinder 154 is rotationally fixed to the low torque drive sleeve 152, so they rotate together. A base structure 140 can include a base plate 146, a base mounting portion 147, and a cylindrical portion 148. The base plate 146 can be coupled to the body 111b of the gearbox assembly 110. The base plate 146 can include a bore through which the drive shaft 170 can extend. The base mounting portion 147 and the cylindrical portion 148 can form a protrusion from the base plate 146 with a generally cylindrical internal bore that extends through the protrusion. The low torque drive sleeve 152 can be disposed within the internal bore of the base structure 140. At least a portion of external threads 151 on the low torque drive sleeve 152 engage internal threads 141 that are positioned at an end of the cylindrical portion 148 of the base structure 140. As the low torque drive sleeve 152 rotates relative to the base structure 140 the engaged threads 141, 151 cause the low torque drive sleeve 152 to translate linearly relative to the base structure 140.

As the drive shaft 170 continues to rotate, the low torque drive sleeve 152 will continue to rotate relative to the base structure 140 and can extend the piston 150. When a force applied to the engagement device 134 exceeds a predetermined amount, then the rotational force of the drive shaft 170 applied to the high torque drive shaft 160 can overcome the static friction between the friction ring 180 and the friction disk 186, thereby allowing the friction disk 186 to rotate relative to the friction ring 180. When the friction disk 186 breaks free of the static friction, the high torque drive shaft 160 will rotate relative to the low torque drive sleeve 152 and the drive cylinder 154. By rotating the high torque drive shaft 160 relative to the low torque drive sleeve 152, external threads 161 of the high torque drive shaft 160, that are engaged with the internal threads 171 of the drive cylinder 154, cause the high torque drive shaft 160 to translate linearly relative to the low torque drive sleeve 152. The rotation of the drive shaft 170 rotates the sun gear 192 of the planetary gear assembly 190 and drives the planet gears 194 to rotate about the sun gear 192. By rotating the planet gears 194, the protrusion 172 is rotated and thereby rotates the high torque drive shaft 160 relative to the drive cylinder 154 via the splines of the protrusion 172 being engaged with the splines of the bore 176. Various seals, such as seals 80, 82, 84, can be included to seal components of the linear actuator assembly 100 from fluids and debris. The seal 80 can be used to wipe the base structure 140 (i.e., end 148) as the piston 150 is extended or retracted.

Figure 5A:
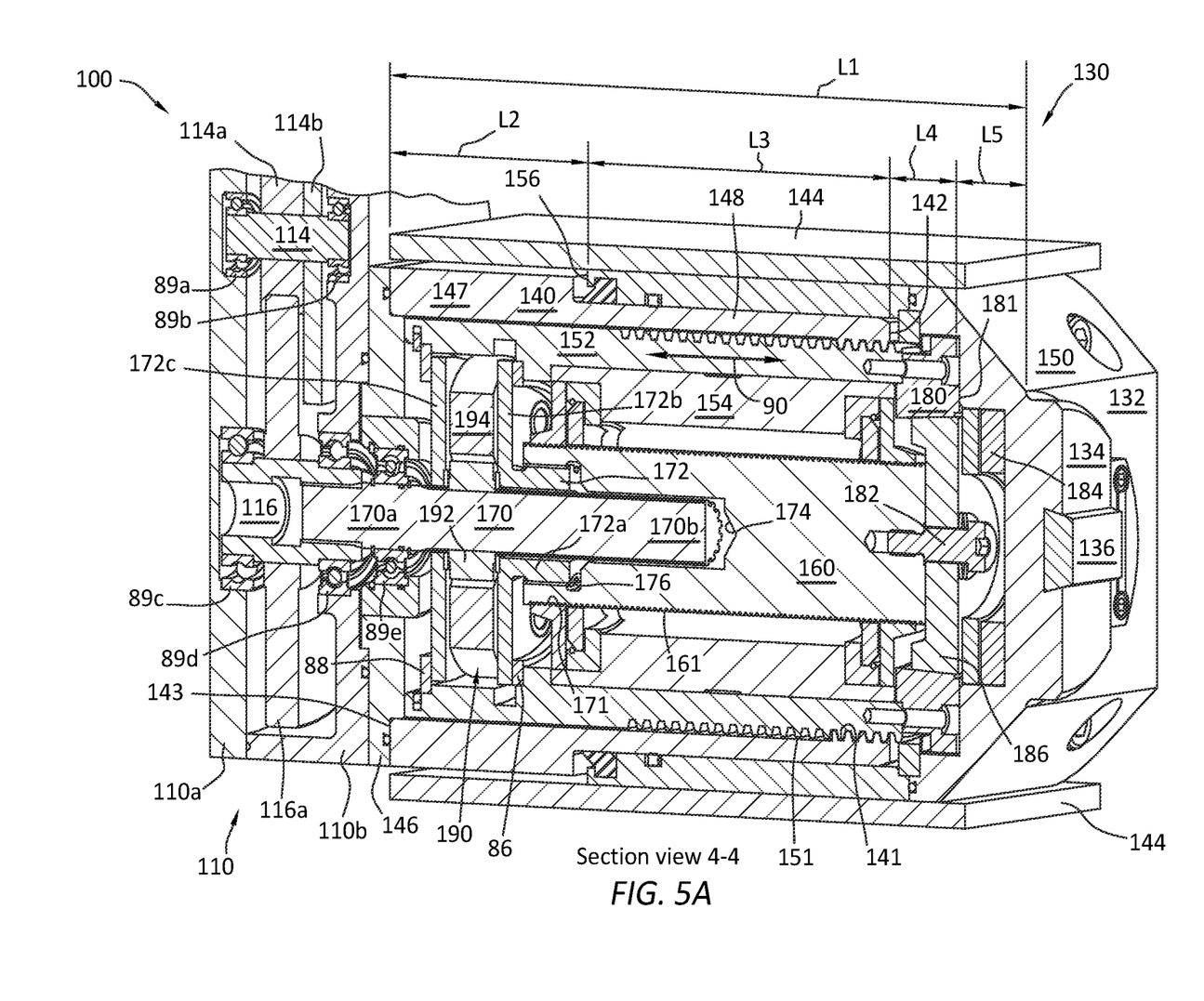
FIG. 5A is a representative partial cross-sectional view of a portion of the linear actuator assembly of FIG. 3 along section line 4-4 in a fully retracted position, in accordance with certain embodiments.

FIG. 5A is a representative partial cross-sectional view of a portion of the linear actuator assembly 100 of FIG. 3 along section line 4-4 with piston 150 in a fully retracted position, in accordance with certain embodiments. The drive shaft 170 has been rotated such that the piston 150 is fully retracted (i.e., length L1 is at a minimum distance). This occurs when the drive shaft 170 rotates the planetary gear assembly 190 via the engagement with the sun gear 192, and linearly displaces the high torque drive shaft 160 toward the base plate 146, thereby ensuring that the friction disk 186 is engaged with the friction ring 180 causing the low torque drive sleeve 152 to rotate with the high torque drive shaft 160.

The length L1 is the distance from an end 143 of the base mounting portion 147 to the engagement device 134 on the piston 150. The length L2 is the distance from the end 143 of the base mounting portion 147 to the end 156 of the piston 150. The length L3 is the distance from the end 156 of the piston 150 to the end 142 of the cylindrical portion 148. The length L4 is the distance from the end 142 to the surface 181 of the friction ring 180. The length L5 is the distance from the surface 181 to the surface 132 of the piston 150.

When it is desired to extend the piston 150 (e.g., to engage a tubular 54, linearly move an object that remains engaged with the piston 150, etc.), the drive shaft 170 can be rotated, thereby rotating the sun gear 192 of the planetary gear assembly 190 and rotating the low torque drive sleeve 152 along with the high torque drive shaft 160. As the drive shaft 170 rotates the planetary gear assembly 190, the high torque drive shaft 160, the low torque drive sleeve 152, and the drive cylinder 154 all rotate together causing the threads 151 of the low torque drive sleeve 152 to linearly move the piston 150 due to the engagement of the threads 151 with the threads 141. As the piston 150 linearly extends, the high torque drive shaft 160, the low torque drive sleeve 152, and the drive cylinder 154 all linearly move outward away from the gearbox assembly 110 along with the piston 150.

As long as the low torque drive sleeve 152 and the high torque drive shaft 160 rotate together, the piston 150 will extend at a first speed (assuming the rotational speed of the drive shaft 170 remains substantially constant while the piston 150 is being extended) until the piston 150 receives a predetermined amount of force acting on the engagement device 134. Bearings 89a, 89b, 89c, 89d, 89e can be used to support rotation of the shafts 114, 116 and 170.

Figure 5B:
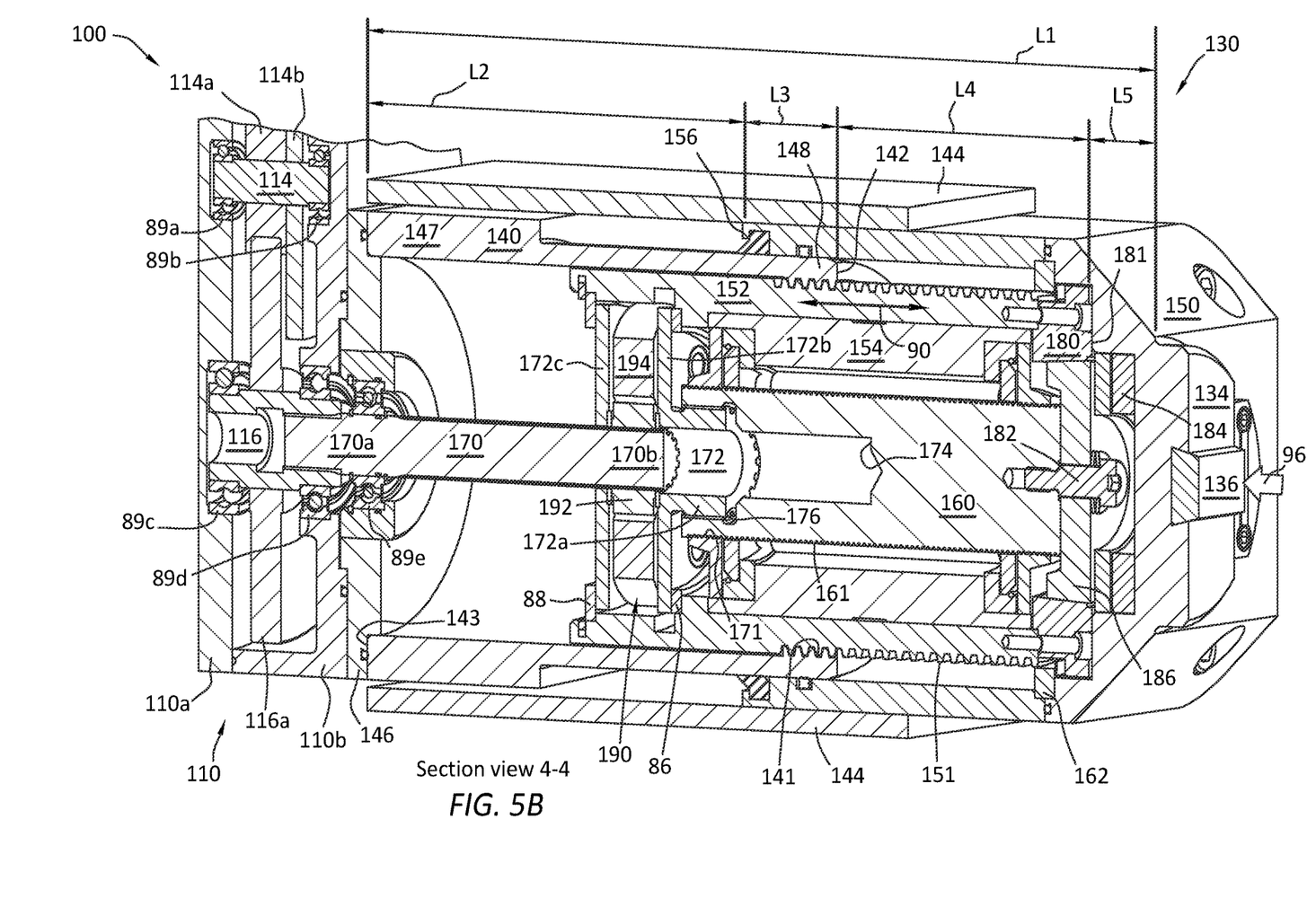
FIG. 5B is a representative partial cross-sectional view of a portion of the linear actuator assembly of FIG. 3 along section line 4-4 with a first stage in a fully extended position, in accordance with certain embodiments.

FIG. 5B is a representative partial cross-sectional view of a portion of the linear actuator assembly 110 of FIG. 3 along section line 4-4 with a first stage in a fully extended position, in accordance with certain embodiments. FIG. 5B shows the low torque drive sleeve 152 extended to substantially a maximum distance that still allows for engagement of the drive shaft 170 with the sun gear 192. At any point in time when the predetermined amount of an opposing force (96) is applied to the engagement device in opposition to the piston 150 being extended, the opposing force 96 can prevent the low torque drive sleeve 152 from being able to further extend the piston 150 at a first speed, and the static friction force between the friction ring 180 and the friction disk 186 can be overcome. At this point, the high torque drive shaft 160 can begin to rotate relative to the low torque drive sleeve 152 and the drive cylinder 154, causing the high torque drive shaft 160 to be further extended, due to the engaged threads 161, 171, and thereby further extending the piston 150, at a slower second speed than the first speed, since the threads 161, 171 can have a finer pitch than the threads 141, 151.

As can be seen, in this non-limiting embodiment, the maximum extension of the low torque drive sleeve 152 has occurred. The threads 141 of the base structure 140 have been threaded substantially to an end of the threads 151 on the low torque drive sleeve 152. However, it should be understood that it is not a requirement for the low torque drive sleeve 152 to be extended to its maximum extension before the high torque drive shaft 160 takes over the extension of the piston 150 at a second speed. The force 96 applied to the engagement device 134 determines when the extension of the low torque drive sleeve 152 stops and the extension of the high torque drive shaft 160 begins. As the high torque drive shaft 160 extends, the length L5 will increase, with the length L4 remaining substantially constant, the length L3 decreasing, and lengths L1 and L2 increasing.

Figure 5C:
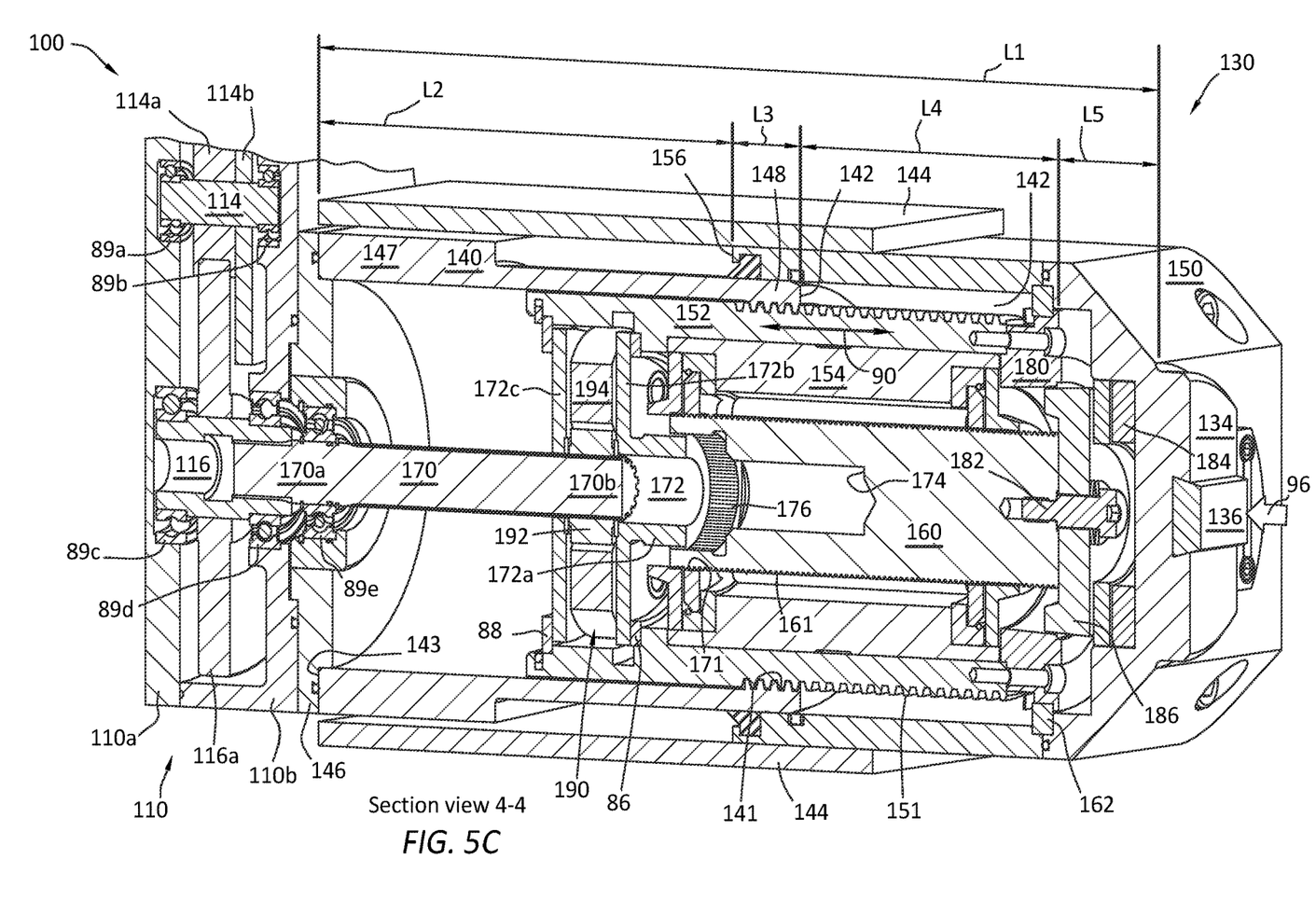
FIG. 5C is a representative partial cross-sectional view of a portion of the linear actuator assembly of FIG. 3 along section line 4-4 with a first stage and a second stage in a fully extended position, in accordance with certain embodiments.

FIG. 5C is a representative partial cross-sectional view of a portion of the linear actuator assembly 100 of FIG. 3 along section line 4-4 with a first stage (the low torque drive sleeve 152) and a second stage (the high torque drive shaft 160) in fully extended positions, in accordance with certain embodiments. FIG. 5C shows the low torque drive sleeve 152 extended to substantially a maximum distance that still allows for engagement of the drive shaft 170 with the sun gear 192 and the high torque drive shaft 160 extended to substantially its maximum distance that still allows for engagement of the protrusion 172 and the splined bore 176. A stop ring 162 removably fixed to the piston 150 can engage the friction ring 180 to prevent further extension of the piston 150.

It should be understood it is not a requirement for the high torque drive shaft 160 to be extended to its maximum extension before the extension of the high torque drive shaft 160 is stopped, for example, by when the force 96 being applied to the engagement device 134 reaches a desired value. When the desired force 96 is being applied (or for example, a desired gripping force is being applied by the engagement device 134 to an object), then the drive motor 124 of the linear actuator assembly 100 can be stopped to stop further extension of the piston 150.

FIGS. 5A-5C show progression of the piston 150 as it is extended from a fully retracted position in FIG. 5A, to an intermediate position in FIG. 5B at a first speed, and then to a fully extended position in FIG. 5C at a second speed by rotating the drive shaft 170 at substantially a constant speed. It should be understood that the rotational speed of the drive shaft 170 can be varied during operation of the linear actuator assembly 100. However, the first speed can be determined by the rotational speed of the drive shaft 170 and the pitch of the threads 141, 151 and the second speed can be determined by the rotational speed of the drive shaft 170 and the pitch of the threads 161, 171. The first speed can be slower than the second speed, but it is preferred that the first speed be faster than the second to extend the piston a majority of the desired distance at a faster speed (and lower torque) and reducing speed of extending the piston the remainder of the desired distance at the second speed (and higher torque).

To retract the piston 150 back to the fully retracted position, the drive shaft 170 can be rotated in an opposite direction, thereby rotating the threaded connections in an opposite direction and causing the piston 150 to be moved linearly toward the base structure 140.

Figure 6A:
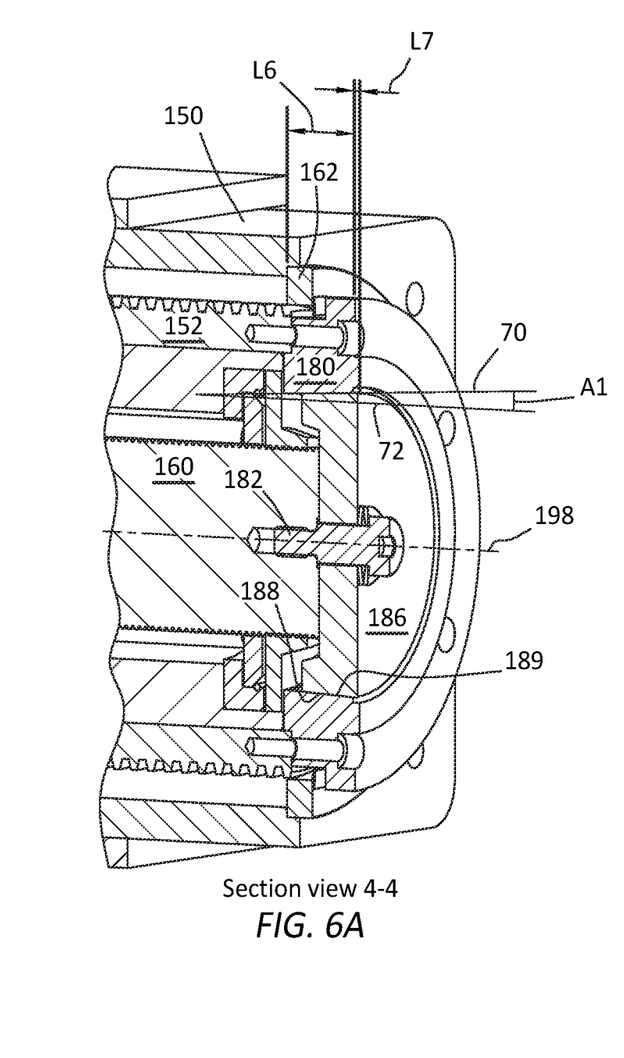
FIG. 6A is a representative detailed partial cross-sectional view of an end portion of the linear actuator assembly of FIG. 3 along section line 4-4 with a first stage in a fully extended position, in accordance with certain embodiments.

FIG. 6A is a representative detailed partial cross-sectional view of an end portion of the linear actuator assembly 100 of FIG. 3 along section line 4-4 with a first stage (the low torque drive sleeve 152) in a fully extended position and the second stage (the high torque drive shaft 160) not yet extended relative to the first stage, in accordance with certain embodiments. The friction disk 186 has a tapered outer surface that is tapered at an angle A1 from the center axis 198. Engagement of the tapered surface of the friction disk 186 to a matching tapered surface on the friction ring 180 creates a static friction between them that resists rotation of the friction disk 186 relative to the friction ring 180. The length L6 is a distance from a bottom side of the stop ring 162 and a top side of the friction ring 180. The length L7 is a distance from a top side of the friction ring 180 and a top side of the friction disk 186.

Figure 6B:
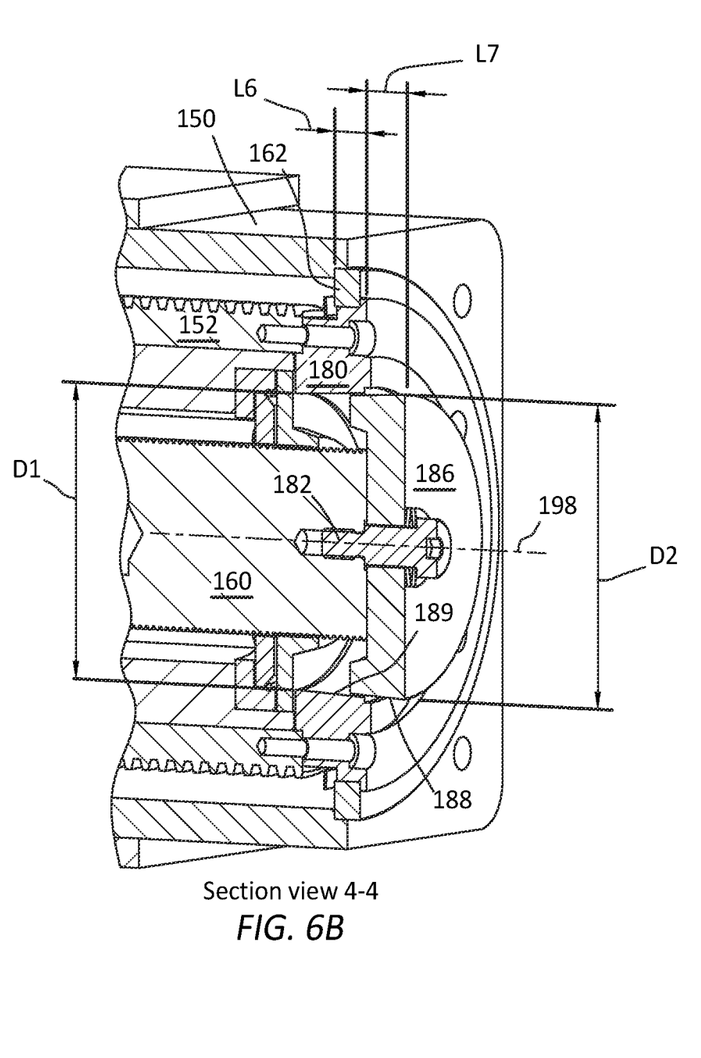
FIG. 6B is a representative detailed partial cross-sectional view of an end portion of the linear actuator assembly of FIG. 3 along section line 4-4 with a first stage and a second stage in fully extended positions, in accordance with certain embodiments.

FIG. 6B is a representative detailed partial cross-sectional view of an end portion of the linear actuator assembly 100 of FIG. 3 along section line 4-4 with a first stage (the low torque drive sleeve 152) and a second stage (the high torque drive shaft 160) in fully extended positions, in accordance with certain embodiments. As the high torque drive shaft 160 rotates relative to the low torque drive sleeve 152 (i.e., the static friction is overcome), the high torque drive shaft 160 moves linearly relative to the low torque drive sleeve 152, thereby linearly moving the friction disk 186 away from the friction ring 180. The length L6 can be decreased to where the stop ring engages the friction ring 180 and ensured the piston extension is limited to the maximum extension determined by the stop ring 162. The length L7 is increased as the top of the friction disk 186 is extended away from the friction ring 180. The outer surface of the friction disk 186 can be tapered from a diameter D2 at a top surface to a smaller diameter D1 at a bottom surface.

VARIOUS EMBODIMENTS

Embodiment 1. A linear actuator assembly comprising:
a first drive shaft; and
a piston, wherein rotation of the first drive shaft extends or retracts the piston at a speed that automatically changes based on an opposing force applied to the piston.

Embodiment 2. The assembly of embodiment 1, wherein the piston comprises an engagement device and the opposing force is applied to the engagement device.

Embodiment 3. The assembly of embodiment 1, wherein the speed automatically changes between a first speed and a second speed, and wherein the first speed is different than the second speed.

Embodiment 4. The assembly of embodiment 3, wherein the piston changes from the first speed to the second speed when the opposing force is increased at or above a predetermined force.

Embodiment 5. The assembly of embodiment 4, wherein the piston changes from the second speed to the first speed when the opposing force is decreased below the predetermined force.

Embodiment 6. The assembly of embodiment 1, wherein a torque force of the first drive shaft automatically changes between a first torque and a second torque, and wherein the first torque is different than the second torque.

Embodiment 7. The assembly of embodiment 6, wherein the torque force changes from the first torque to the second torque when the opposing force is increased at or above a predetermined force.

Embodiment 8. The assembly of embodiment 7, wherein the torque force changes from the second torque to the first torque when the opposing force is decreased below the predetermined force.

Embodiment 9. The assembly of embodiment 1, further comprising:
a low torque drive sleeve with a friction ring attached at one end; and
a high torque drive shaft with a friction disk attached at one end, wherein the friction disk engages the friction ring when the opposing force is below a predetermined force, and wherein the engagement of the friction disk with the friction ring creates a static friction force that resist rotation of the friction disk relative to the friction ring.

Embodiment 10. The assembly of embodiment 9, wherein a bearing is coupled between the friction disk and the piston, such that the friction disk rotates relative to the piston when the first drive shaft rotates.

Embodiment 11. The assembly of embodiment 10, wherein the friction disk applies a force from the high torque drive shaft to the piston via the bearing as the high torque drive shaft is extended in response to the rotation of the drive shaft.

Embodiment 12. The assembly of embodiment 9, wherein the first drive shaft is rotationally coupled to the low torque drive sleeve via a gear assembly that allows the first drive shaft to rotate relative to the low torque drive sleeve; and wherein the high torque drive shaft is coupled to a splined protrusion of the gear assembly, which causes the high torque drive shaft to rotate with the splined protrusion and allows the high torque drive shaft to move linearly relative to the splined protrusion.

Embodiment 13. The assembly of embodiment 12, wherein, when the opposing force is below the predetermined force, the first drive shaft rotates the low torque drive sleeve via the gear assembly and the high torque drive shaft via the engagement of the friction disk 186 with the friction ring 180.

Embodiment 14. The assembly of embodiment 13, wherein the first drive shaft rotates the low torque drive sleeve relative to the piston.

Embodiment 15. The assembly of embodiment 12, wherein, when the opposing force is at or above the predetermined force, the first drive shaft rotates relative to the low torque drive sleeve via the gear assembly and rotates the high torque drive shaft via the splined protrusion of the gear assembly.

Embodiment 16. The assembly of embodiment 15, wherein the gear assembly is a planetary gear assembly, wherein the low torque drive sleeve remains stationary relative to the piston, while the first drive shaft drives a sun gear of the planetary gear assembly and one or more planet gears orbit the sun gear.

Embodiment 17. The assembly of embodiment 1, further comprising:
a motor coupled to the first drive shaft, wherein operation of the motor causes the first drive shaft to rotate.

Embodiment 18. The assembly of embodiment 17, wherein the motor comprises a second drive shaft that is coupled to the first drive shaft via a gearbox assembly, and wherein the second drive shaft is substantially parallel to the first drive shaft.

Embodiment 19. The assembly of embodiment 18, wherein the motor is electrically, hydraulically, or pneumatically powered.

Embodiment 20. A system for performing a subterranean operation, the system comprising:
- a piece of rig equipment configured to engage an object;
- one or more linear actuator assemblies are incorporated into the piece of rig equipment, wherein the one or more linear actuator assemblies selectively engage the object, wherein each of the one or more linear actuator assemblies comprise:
- a first drive shaft; and
- a piston, wherein rotation of the first drive shaft extends or retracts the piston at a speed that automatically changes based on an opposing force applied to the piston by engagement with the object.

Embodiment 21. The system of embodiment 20, wherein the piece of rig equipment is one of an iron roughneck, a pipe handler, a top drive, or an elevator.

Embodiment 22. The system of embodiment 20, wherein the speed automatically changes between a first speed and a second speed, and wherein the first speed is different than the second speed.

Embodiment 23. The system of embodiment 22, wherein the piston changes from the first speed to the second speed when the opposing force is increased at or above a predetermined force.

Embodiment 24. The system of embodiment 23, wherein the piston changes from the second speed to the first speed when the opposing force is decreased below the predetermined force.

Embodiment 25. The system of embodiment 20, wherein a torque force of the first drive shaft automatically changes between a first torque and a second torque, and wherein the first torque is different than the second torque.

Embodiment 26. The system of embodiment 25, wherein the torque force changes from the first torque to the second torque when the opposing force is increased at or above a predetermined force.

Embodiment 27. The system of embodiment 26, wherein the torque force changes from the second torque to the first torque when the opposing force is decreased below the predetermined force.

Embodiment 28. A method for conducting a subterranean operation, the method comprising:
- actuating a linear actuator assembly to operate at least a portion of a piece of rig equipment on a rig, wherein the piece of rig equipment performs a function on a rig during execution of the subterranean operation, the linear actuator assembly comprising:
- a first drive shaft; and
- a piston, wherein rotation of the first drive shaft extends or retracts the piston at a speed that automatically changes based on an opposing force applied to the piston.

Embodiment 29. The method of embodiment 28, wherein the linear actuator assembly is a linear actuator assembly of embodiment 2.

Embodiment 30. A method of operating a linear actuator assembly, the method comprising:
- coupling a motor to a first drive shaft;
- rotating, via the motor, a first drive shaft in a first direction;
- extending a piston at a first speed in response to rotating the first drive shaft in the first direction;
- receiving an opposing force at the piston; and
- automatically changing an extension speed of the piston from the first speed to a second speed due to the piston receiving the opposing force.

Embodiment 31. The method of embodiment 30, wherein the opposing force is a predetermined force.

Embodiment 32. The method of embodiment 31, wherein the extension speed changes from the first speed to the second speed when the opposing force is increased at or above the predetermined force.

Embodiment 33. The method of embodiment 31, wherein rotating the first drive shaft rotates, via a gear assembly, a low torque drive sleeve along with a high torque drive shaft relative to the piston when the opposing force is below the predetermined force.

Embodiment 34. The method of embodiment 33, wherein the high torque drive shaft is disposed within the low torque drive sleeve and coaxially aligned with the low torque drive sleeve.

Embodiment 35. The method of embodiment 33, further comprising:
- attaching a friction ring to an end of the low torque drive sleeve, such that the friction ring rotates with the low torque drive sleeve;
- attaching a friction disk to an end of the high torque drive shaft, such that the friction disk rotates with the high torque drive shaft; and
- engaging the friction disk with the friction ring, thereby creating a static friction force between the friction ring and the friction disk, wherein the static friction force prevents rotation of the friction ring relative to the friction disk when the opposing force is below the predetermined force.

Embodiment 36. The method of embodiment 31, wherein rotating the first drive shaft rotates, via a gear assembly, a high torque drive shaft relative to the piston and a low torque drive sleeve when the opposing force is at or above the predetermined force.

Embodiment 37. The method of embodiment 36, further comprising:
- attaching a friction ring to an end of the low torque drive sleeve, such that the friction ring rotates with the low torque drive sleeve;
- attaching a friction disk to an end of the high torque drive shaft, such that the friction disk rotates with the high torque drive shaft; and
- engaging the friction disk with the friction ring, thereby creating a static friction force between the friction ring and the friction disk, wherein the static friction force prevents rotation of the friction ring relative to the friction disk when the opposing force is below the predetermined force.

Embodiment 38. The method of embodiment 37, further comprising:
- overcoming the static friction force when the opposing force is at or above the predetermined force; and
- rotating the high torque drive shaft relative to the piston and the low torque drive sleeve, thereby linearly moving the high torque drive shaft relative to the low torque drive sleeve.

Embodiment 39. The method of embodiment 38, further comprising linearly moving the piston in response to linearly moving the high torque drive shaft.

Embodiment 40. The method of embodiment 31, further comprising:
- rotating, via the motor, the first drive shaft in a second direction that is opposite to the first direction;

retracting the piston at the second speed in response to rotating the first drive shaft in the second direction; and automatically changing a retraction speed of the piston from the second speed to the first speed due to the piston receiving the opposing force that is below the predetermined force.

Embodiment 41. A method of operating a linear actuator assembly, the method comprising:

coupling a motor to a first drive shaft;

rotating, via the motor, a first drive shaft in a first direction;

extending a piston at a first torque in response to rotating the first drive shaft in the first direction;

receiving an opposing force at the piston; and automatically changing an extension torque of the piston from the first torque to a second torque due to the piston receiving the opposing force.

Embodiment 42. The method of embodiment 41, wherein the opposing force is a predetermined force.

Embodiment 43. The method of embodiment 42, wherein the extension torque changes from the first torque to the second torque when the opposing force is increased at or above the predetermined force.

Embodiment 44. The method of embodiment 42, wherein rotating the first drive shaft rotates, via a gear assembly, a low torque drive sleeve along with a high torque drive shaft relative to the piston when the opposing force is below the predetermined force.

Embodiment 45. The method of embodiment 44, further comprising:

attaching a friction ring to an end of the low torque drive sleeve, such that the friction ring rotates with the low torque drive sleeve;

attaching a friction disk to an end of the high torque drive shaft, such that the friction disk rotates with the high torque drive shaft; and engaging the friction disk with the friction ring, thereby creating a static friction force between the friction ring and the friction disk, wherein the static friction force prevents rotation of the friction ring relative to the friction disk when the opposing force is below the predetermined force.

Embodiment 46. The method of embodiment 42, wherein rotating the first drive shaft rotates, via a gear assembly, a high torque drive shaft relative to the piston and a low torque drive sleeve when the opposing force is at or above the predetermined force.

Embodiment 47. The method of embodiment 46, further comprising:

attaching a friction ring to an end of the low torque drive sleeve, such that the friction ring rotates with the low torque drive sleeve;

attaching a friction disk to an end of the high torque drive shaft, such that the friction disk rotates with the high torque drive shaft; and engaging the friction disk with the friction ring, thereby creating a static friction force between the friction ring and the friction disk, wherein the static friction force prevents rotation of the friction ring relative to the friction disk when the opposing force is below the predetermined force.

Embodiment 48. The method of embodiment 47, further comprising:

overcoming the static friction force when the opposing force is at or above the predetermined force; and rotating the high torque drive shaft relative to the piston and the low torque drive sleeve, thereby linearly moving the high torque drive shaft relative to the low torque drive sleeve.

Embodiment 49. The method of embodiment 48, further comprising linearly moving the piston in response to linearly moving the high torque drive shaft.

Embodiment 50. The method of embodiment 42, further comprising:

rotating, via the motor, the first drive shaft in a second direction that is opposite to the first direction;

retracting the piston at the second torque in response to rotating the first drive shaft in the second direction; and automatically changing a retraction torque of the piston from the second torque to the first torque due to the piston receiving the opposing force that is below the predetermined force.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A linear actuator assembly comprising:
a first drive shaft;
a piston, wherein rotation of the first drive shaft extends or retracts the piston at a speed that automatically changes based on an opposing force applied to the piston;
a low torque drive with a friction ring attached at one end; and
a high torque drive shaft with a friction disk attached at one end, wherein the friction disk engages the friction ring when the opposing force is below a predetermined force, and wherein engagement of the friction disk with the friction ring creates a static friction force that resists rotation of the friction disk relative to the friction ring.

2. The linear actuator assembly of claim 1, wherein the piston comprises an engagement device and the opposing force is applied to the engagement device.

3. The linear actuator assembly of claim 1, wherein the speed automatically changes between a first speed and a second speed, and wherein the first speed is different than the second speed.

4. The linear actuator assembly of claim 3, wherein the piston changes from the first speed to the second speed when the opposing force is increased at or above a predetermined force.

5. The linear actuator assembly of claim 4, wherein the piston changes from the second speed to the first speed when the opposing force is decreased below the predetermined force.

6. The linear actuator assembly of claim 1, wherein a torque force of the first drive shaft automatically changes between a first torque and a second torque, and wherein the first torque is different than the second torque.

7. The linear actuator assembly of claim 6, wherein the torque force changes from the first torque to the second torque when the opposing force is increased at or above a predetermined force.

8. The linear actuator assembly of claim 7, wherein the torque force changes from the second torque to the first torque when the opposing force is decreased below the predetermined force.

9. The linear actuator assembly of claim 1, wherein a bearing is coupled between the friction disk and the piston, such that the friction disk rotates relative to the piston when the first drive shaft rotates.

10. A method of operating a linear actuator assembly, the method comprising:
   coupling a motor to a first drive shaft;
   rotating, via the motor, the first drive shaft in a first direction;
   extending a piston at a first speed in response to rotating the first drive shaft in the first direction;
   receiving an opposing force at the piston; and
   automatically changing an extension speed of the piston from the first speed to a second speed due to the piston receiving the opposing force, wherein the opposing force is a predetermined force wherein the extension speed changes from the first speed to the second speed when the opposing force is increased at or above the predetermined force, wherein rotating the first drive shaft rotates, via a gear assembly, 1) a low torque drive sleeve along with a high torque drive shaft relative to the piston when the opposing force is below the predetermined force or 2) a high torque drive shaft relative to the piston and a low torque drive sleeve when the opposing force is at or above the predetermined force.

11. The method of claim 10, further comprising:
   attaching a friction ring to an end of the low torque drive sleeve, such that the friction ring rotates with the low torque drive sleeve;
   attaching a friction disk to an end high torque drive shaft, such that the friction disk rotates with the high torque drive shaft; and
   engaging the friction disk with the friction ring, thereby creating a static friction force between the friction ring and the friction disk, wherein the static friction force prevents rotation of the friction ring relative to the friction disk when the opposing force is below the predetermined force.

12. The method of claim 11, further comprising:
   overcoming the static friction force when the opposing force is at or above the predetermined force; and
   rotating the high torque drive shaft relative to the piston and the low torque drive sleeve, thereby linearly moving the high torque drive shaft relative to the low torque drive sleeve.

13. The method of claim 10, wherein the high torque drive shaft is disposed within the low torque drive sleeve and coaxially aligned with the low torque drive sleeve.

14. The method of claim 12, further comprising linearly moving the piston in response to linearly moving the high torque drive shaft.

15. A method of operating a linear actuator assembly, the method comprising:
   coupling a motor to a first drive shaft;
   rotating, via the motor, the first drive shaft in a first direction;
   extending a piston at a fire speed in response to rotating the first drive shaft in the first direction;
   receiving an opposing force at the piston;
   automatically changing an extension speed of the piston from the first speed to a second speed due to the piston receiving the opposing force, wherein the opposing force is a predetermined force, and wherein the extension speed changes from the first speed to the second speed when the opposing force is increased at or above the predetermined force;
   rotating, via the motor, the first drive shaft in a second direction that is opposite to the first direction;
   retracting the piston at the second speed in response to rotating the first drive shaft in the second direction; and
   automatically changing a retraction speed of the piston from the second speed to the first speed due to the piston receiving the opposing force that is below the predetermined force.

16. The linear actuator assembly of claim 9, wherein the friction disk applies a force from the high torque drive shaft to the piston via the bearing as the high torque drive shaft is extended in response to the rotation of the drive shaft.

17. The linear actuator assembly of claim 1, wherein the first drive shaft is rotationally coupled to the low torque drive sleeve via a gear assembly that allows the first drive shaft to rotate relative to the low torque drive sleeve; and wherein the high torque drive shaft is coupled to a splined protrusion of the gear assembly, which causes the high torque drive shaft to rotate with the splined protrusion and allows the high torque drive shaft to move linearly relative to the splined protrusion.

18. The linear actuator assembly of claim 17, wherein, when the opposing force is below the predetermined force, the first drive shaft rotates the low torque drive sleeve via the gear assembly and the high torque drive shaft via the engagement of the friction disk 186 with the friction ring 180.

19. The linear actuator assembly of claim 18, wherein the first drive shaft rotates the low torque drive sleeve relative to the piston.

20. The linear actuator assembly of claim 17, wherein, when the opposing force is at or above the predetermined force, the first drive shaft rotates relative to the low torque drive sleeve via the gear assembly and rotates the high torque drive shaft via the splined protrusion of the gear assembly.

* * * * *